United States Patent [19]

Page et al.

[11] Patent Number: 4,478,104

[45] Date of Patent: Oct. 23, 1984

[54] LEVER MECHANISM

[75] Inventors: Ronald C. Page, Balsall Common; Derek J. Smith, Curdworth, both of England

[73] Assignee: Massey-Ferguson Services N.V., Curacao, Netherlands Antilles

[21] Appl. No.: 377,215

[22] Filed: May 11, 1982

[30] Foreign Application Priority Data

May 14, 1981 [GB] United Kingdom ................. 8114766

[51] Int. Cl.$^3$ ....................... G05G 11/00; G05G 1/00; F16H 21/44
[52] U.S. Cl. ....................................... 74/479; 74/491; 74/102; 280/461 A; 172/7
[58] Field of Search ............. 74/491, 523, 479, 480 R, 74/102, 141.5, 150, 156, 535, 534, 533; 172/7–12, 439; 280/461 A, 460 A, 456 A

[56] References Cited

U.S. PATENT DOCUMENTS

| | | | |
|---|---|---|---|
| 2,679,199 | 5/1954 | Strehlow | 172/8 X |
| 2,721,508 | 10/1955 | Edman | 172/10 X |
| 2,722,874 | 11/1955 | Bopf | 172/12 X |
| 2,981,381 | 4/1961 | Swift | 74/491 X |
| 3,162,247 | 12/1964 | Miller | 172/7 |
| 3,331,447 | 7/1967 | Simark | 172/9 |
| 3,422,906 | 1/1969 | Bunting et al. | 172/9 |
| 3,463,510 | 8/1969 | Van Syoc | 172/7 X |
| 3,580,104 | 5/1971 | Yashiro et al. | 74/491 X |
| 3,661,352 | 5/1972 | McFarlane | 74/533 X |
| 3,753,467 | 8/1973 | Wilson | 172/7 X |
| 3,789,694 | 2/1974 | Haupt | 74/491 X |
| 4,075,907 | 2/1978 | Petrzelka | 74/523 |
| 4,086,824 | 5/1978 | Johnson | 74/491 X |
| 4,119,000 | 10/1978 | Venable | 74/480 R X |
| 4,393,730 | 7/1983 | Randall | 74/491 X |

FOREIGN PATENT DOCUMENTS

| | | | |
|---|---|---|---|
| 234417 | 7/1964 | Austria | 172/7 |
| 1050106 | 2/1959 | Fed. Rep. of Germany | 172/7 |
| 384917 | 2/1965 | Switzerland | 172/7 |
| 404996 | 7/1966 | Switzerland | 172/7 |
| 1101775 | 2/1968 | United Kingdom . | |
| 1478099 | 6/1977 | United Kingdom . | |

Primary Examiner—Leslie A. Braun
Assistant Examiner—Michael J. Gonet
Attorney, Agent, or Firm—Robert L. Farris

[57] ABSTRACT

A lever mechanism (10) suitably, amongst other uses, for use in the control of tractor draft links (22) from a location remote from the tractor operators station.

The lever mechanism includes an operating member (40), a support (43) relative to which said operating member is displaceable (Z), a lever (42) pivotally mounted on the support about a pivot axis (44) which is also translationally moveable (X), a first formation (56) on the lever, a second formation (57) on the operating member, and bias means (53) acting to translationally move the lever on its axis (44) away from the second formation (57) to hold the first and second formations (56,57) disengaged when the lever is released. The operating member is displaceable in a given direction (Z) relative to the support (43) by translational movement (X) of the lever (42) on its moveable axis (44) against the bias (53) to bring the first and second formations (56,57) into engagement followed by pivotting (Y) of the lever relative to the support with the first and second formations engaged.

When used to control tractor draft links the lever mechanism forms part of the draft link control system and is connected with the remainder of the system via operating member (40).

6 Claims, 3 Drawing Figures

LEVER MECHANISM

TECHNICAL FIELD

This invention relates to lever mechanisms and particularly, though not exclusively, to lever mechanisms for use in the control of tractor draft links from a location remote from the tractor operators station in order to facilitate, for example, the coupling of an implement to the draft-links.

DISCLOSURE OF THE INVENTION

It is an object of the present invention to provide a lever mechanism which is suitable for use in the remote control of tractor draft links as referred to above.

Thus in accordance with the present invention there is provided a lever mechanism including an operating member, a support relative to which said operating member is displaceable, a lever pivotally mounted on the support about a pivot axis which is also translationally moveable, a first formation on the lever, a second formation on the operating member, and bias means acting to translationally move the lever on its axis away from the second formation to hold the first and second formations disengaged when the lever is released, the operating member being displaceable in a given direction by translational movement of the lever on its moveable axis against the bias to bring the first and second formations into engagement followed by pivotting of the lever relative to the support with the first and second formations engaged.

A lever mechanism in accordance with the preceding paragraph is particularly suitable for use in the control of tractor draft links from a position remote from the tractor operators station.

Thus the present invention also provides a tractor draft link control system including a lever mechanism in accordance with the next but one preceding paragraph, the operating member of the lever mechanism being connected with the remainder of the control system so that operation of the lever to displace the operating member in said given direction is arranged to initiate raising or lowering of tractor draft links.

The invention also provides a tractor with vertically pivotable draft links whose vertical position is controlled by a control system according to the preceding paragraph, and in which the lever mechanism is mounted on a rearward portion of the tractor to allow operation of the lever by an operator standing to the rear of the tractor at a location outside the draft links.

Using the above lever mechanism the coupling of an implement to the draft-links of the tractor becomes a one man operation which can be accomplished by an operator standing to the rear of the tractor at a location outside the draft-links. The operator simply raises/lowers the draft links using the lever to bring the implement and draft-link attachment means into vertical alignment.

As will be evident from the description below the lever mechanism includes a number of safety features. For example, each full pivotting sweep of the lever with the first and second formations in engagement can be arranged to result in only a small raising/lowering of the draft-links so that the operator is protected against sudden and excessive raising and lowering which might lead to him becoming trapped.

Additionally, when the lever is released the bias ensures that the first and second formations disengage thus preventing further movement of the draft-links and ensuring that when the operator returns to control the draft links from his normal station (for example inside a cab) any previous use of the remotely mounted lever mechanism will not interfere with the subsequent ability to control the links from the normal draft link control lever or levers mounted adjacent to the operators station.

Returning to the details of the lever mechanism, conveniently the first formation may comprise a pin carried by the lever and the second formation may comprise a rack cut in or carried by the displaceable operating memeber.

The bias means may be a spring which acts between the pivot axis and the support, the pivot axis being translationally moveable within a slot in the support which extends substantially at right angles to the intended direction of displacment of the operating member.

Conveniently, when the lever mechanism is intended for use in the control of tractor draft links, the mechanism is installed so that the lever is pulled generally downwardly against the bias to engage the second formation and pivoted about a generally horizontal axis.

It will be appreciated that the arc through which the lever can be pivoted with the first and second formations in engagement can be limited to control the total possible displacement of the operating member in said given direction for each full pivotting sweep of the lever. This gives the additional safety feature discussed above when the lever mechanism is applied to the control of tractor draft links. Clearly, if more movement of the operating member is required than can be obtained by one full pivotting sweep of the lever, the lever must first be released and then pulled again against the biassed to re-engage the first and second formations for a second pivotting sweep.

The invention also provides a tractor with vertically pivotable draft links, and a draft link control system including an actuating means for vertically pivotting the draft links, a first control lever located adjacent the tractor operators station and operable via linkage means to cause the actuating means to pivot the draft links, a second control lever located on a rearward portion of the tractor for operation by an operator standing to the rear of the tractor at a location outside the draft links, said second control lever being pivotally mounted on a support about a pivot axis which is also translationally moveable, a first formation on the second control lever, a second formation on an operating member connected with the linkage means, and bias means acting to translationally move the second control lever on its axis away from the second formation to hold the first and second formations disengaged when the lever is released, the second control lever being operable to move the operating member, and hence the linkage means, to cause the actuating means to pivot the draft links by translationally moving the second control lever on its moveable axis against the bias to bring the first and second formations into engagement followed by pivotting of the second control lever relative to the support with the first and second formations engaged.

DESCRIPTION OF DRAWINGS

One embodiment of the present invention, as applied to the control of tractor draft links, will now be described, by way of example only, with reference to the accompanying drawings in which.

BEST MODE OF CARRYING OUT INVENTION

Figure 1:
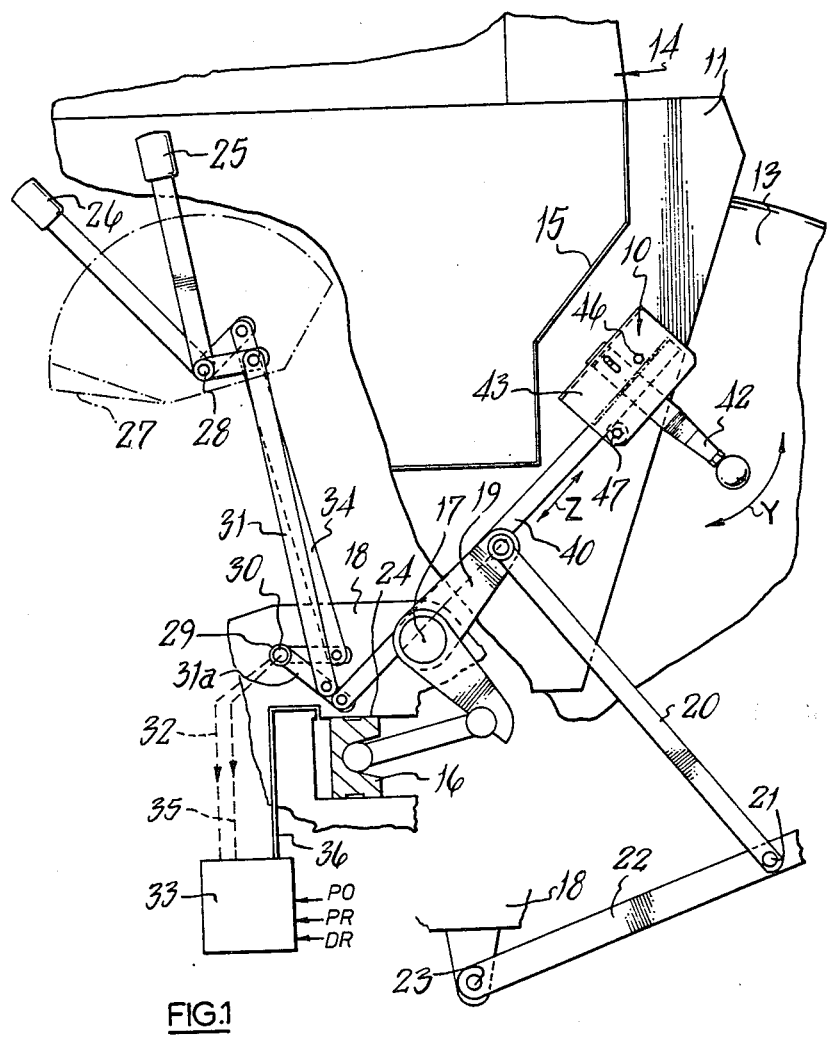
FIG. 1 is a diagrammatic view of a lever mechanism embodying the present invention used in the control of tractor draft links.

Referring to FIG. 1, this shows part of the rear portion of a tractor in which a lever mechanism 10 in accordance with the present invention is secured on the inside of the right hand rear wheel fender 11 of the tractor. Part of the right hand wheel is indicated at 13 and the tractor cab is indicated at 14 with its rear wall shown at 15.

The tractor has a rear axle housing, parts of which are indicated at 18. A cross-shaft 17 is pivotally mounted on the housing 18 and carries a pair of lift arms 19 each of which is connected to a lift rod 20 whose lower end is connected at 21 with a draft-link 22 of a three point hitch pivotted on another part of the rear axle housing at 23.

A draft link control system is provided which includes a draft link actuating means in the form of a piston and cylinder assembly 16,24 which is supplied, via conduit 36, with pressurised fluid from a pump (not shown). Fluid can also be exhausted from piston and cylinder assembly 16,24 via conduit 36. Thus axial displacement of piston 16 within cylinder 24 causes raising/lowering of the draft links 22 in a conventional manner.

The basic draft link control system may be of any conventional form. For example, a system of the type described and claimed in UK Pat. No. 1101775 is suitable and will therefore be described to facilitate a full understanding of the present invention.

Thus two control levers 25 and 26 operating in adjacent control quadrants 27 and 28 are provided. The levers 25 and 26 pivot about alinged axes 28, lever 25 controlling the power lift in the so-called "position control" or "pressure-control" modes dependent on the position of lever 25 on quadrant 27, and lever 26 controlling the power lift in the so-called "draft-control" mode.

Lever 25 is connected via a control linkage 31 with a rotatable sleeve 29 surrounding a shaft 30 supported in the side of housing 18. Sleeve 29 is then connected within housing 18 via a further control linkage, shown schematically by dotted link 32, with the remainder of the control system shown schematically by box 33 and which includes further linkages, the fluid pump, and a control valve for controlling the supply of fluid to and exhausting fluid from the piston and cylinder assembly 16,24 via conduit 36.

In a similar fashion lever 26 is connected via control linkage 34 with shaft 30 which is in turn connected within housing 18, via a further control linkage shown schematically at 35, with the remainder of the control system 33.

Thus in the known manner lever 25 is operated to set the desired operating value of 'position' or 'pressure' when the power lift is being controlled in the "position control" or "pressure control" modes and lever 26 sets the desired level of 'draft force' when the system is operating in the "draft control" mode. The control system also receives feedback signals of the actual hitch position, system fluid pressure, or draft force as indicated schematically by allows 'PO', 'PR', and 'DR' in FIG. 1. The appropriate feedback signal is compared by the control system with the desired value signal set by control lever 25 or 26 to produce an error signal which is used to control the control valve which supplies or exhausts hydraulic fluid from piston and cylinder 16,24 via conduit 36 so that the desired operating condition of the hitch is attained.

Thus far described the draft link control system is of the general type described in the previously referred to UK Pat. No. 1101775 to which the reader is directed if requiring a fuller description of a practical embodiment of such a control system.

The draft link control system also incorporates the lever mechanism 10 of the present invention which includes a lever 42 which can be pivoted (as indicated by arrow Y) to displace an operating member 40 backwards or forwards (as indicated by arrow Z). Operating member 40 is connected with an arm 31a which forms part of the control linkage 31. Thus, as will be described in greater detail below, with the control lever 25 set to control the power lift in the "position control" mode pivotting of lever 42 gives a signal input to the control system 33 via member 40, arm 31a, sleeve 29 and linkage 32 which causes the draft-links to either rise or fall depending on the direction of pivoting of lever 42. This, for example, enables the tractor operator to raise/lower the draft-links whilst standing to the rear of the tractor at a location outside the draft-links so that coupling up of an implement to the tractor becomes a simple one man operation.

Figure 2:
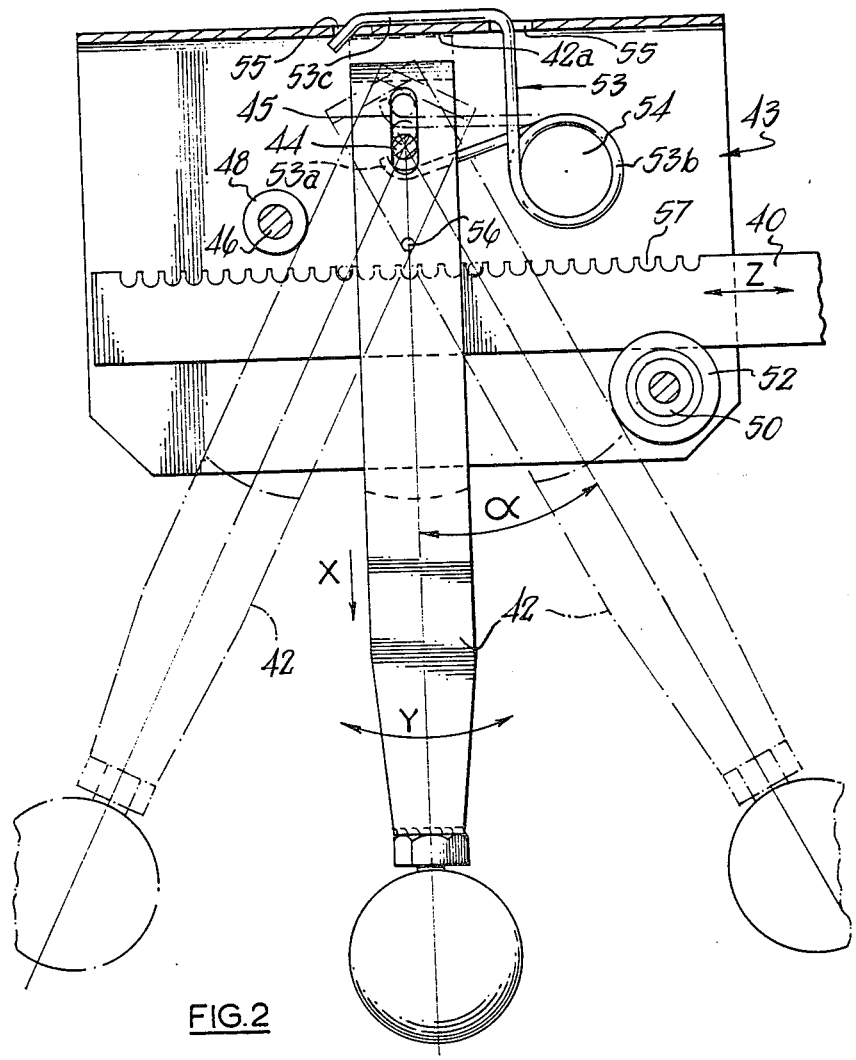
FIG. 2 is a side view on a larger scale of the lever mechanism of FIG. 1.
Figure 3:
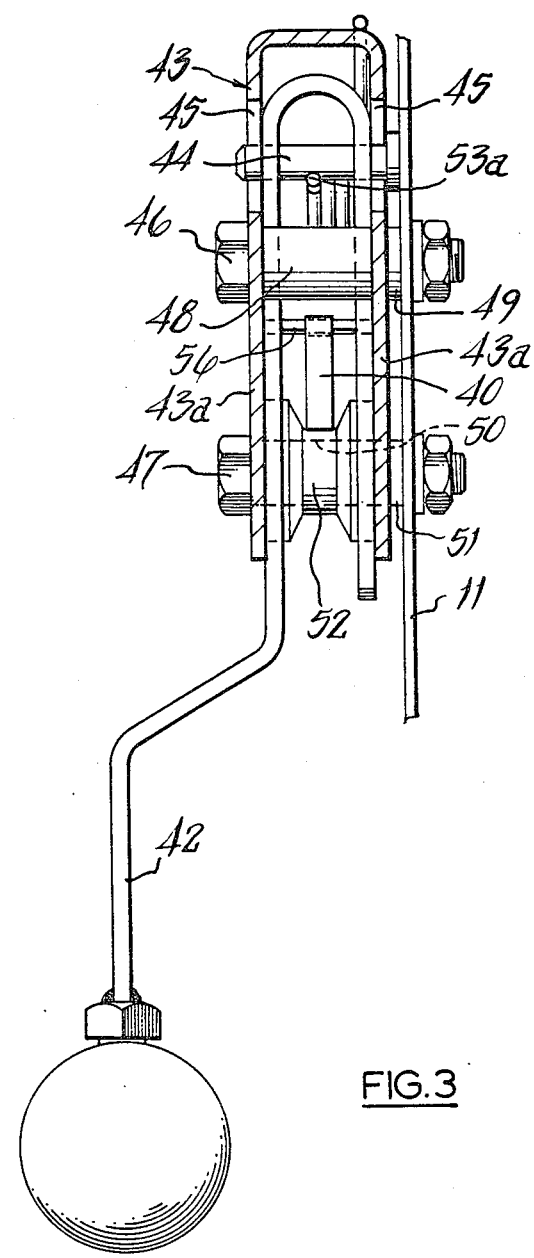
FIG. 3 is an end view of the lever mechanism of FIG. 2.

Turning now to FIGS. 2 and 3 for a more detailed description of the lever mechanism 10, it will be seen that the upper part of lever 42 is of U-shaped cross-section and is pivotally mounted on a support 43 of U-shaped cross-section by a pin 44 which slides in slots 45 in the two arms 43a of the U-shaped support. The support 43 is secured to fender 11 by two bolts 46 and 47 which extend through spacing pieces 48,49 and 50,51 respectively. A grooved bobbin 52 is rotatably mounted on spacing piece 50 and provides a guide for the displacement of operating member 40.

A spring 53 acts between the support 43 and the pin 44 to bias the pin 44 and hence the lever 42 upwardly in slots 45 so that, when lever 42 is released the lever occupies a stable central position with its upper end 42a against the inside of support 43. As can be seen from FIG. 2, one end 53a of spring 53 acts on pin 44, the central portion 53b is wrapped around a stabilizing core 54 which floats between the arms of the support 43 and the other end of 53c of the spring passes through holes 55 in the support.

The lever 42 carries a first operating formation in the form of a further pin 56 which is engageable with a second operating formation in the form of rack 57 provided on operating member 40.

From the above description it will be evident that, if the lever 42 is pulled downwardly in the direction of arrow X against the action of spring 53, pin 56 will engage rack 57 and on pivoting of lever 42 about pin 44 in the direction of arrow Y the operating member 40 will be moved backwards or forwards as indicated by arrow Z.

As described previously, when the lever 42 is released the pin 56 automatically disengages the rack 57 under the action of spring 53 and the lever returns to the centre stable postion 42a. As discussed above this is a significant feature.

The permitted arc of movement of lever 42 is defined by the positioning of spacing pieces 48 and 50 through which bolts 46 and 47 extend. Typically the lever arrangement and its connection with the control linkage 31 is arranged such that an angular movement of α of lever 42 produces approximately 100 mm of alteration in the height of the outer ends of the associated draft links of the tractor.

It will be understood that the operator can in fact achieve a total angular movement of the lever 42 whilst enmeshed with rack 57 equal to 2α by engaging the pin 56 with the rack when the lever is in one extreme of its travel and moving the lever throughout its full permitted range of travel.

It should be noted that the control lever arrangement of the present invention will still operate to adjust the height of the draft-links even if the control lever 25 is set in the "pressure control" portion of the quadrant 27 provided that the movement of the lever 25 into the "position control" portion of the quadrant 27 is not obstructed by any stop. Thus if the lever 25 is in the pressure control portion of the quadrant the initial movements of the lever 42 will simply move the control lever into the pressure control portion of the quadrant and will not cause any adjustment of the height of the draft-links. Once the lever 25 has moved into the position control portion of the quadrant further movements of the lever 42 continue to move lever 25 and also cause adjustment in the height of the draft links.

The present invention thus provides a lever mechanism which is particularly suited for the control of the height of tractor draft-links from a location remote from the normal operators station.

Although the lever mechanism of the present invention has been described above solely in relation to the control of a tractor draft links it is not limited to such an application nor is it limited to use with the particular basic tractor draft link control system lift described. Clearly the lever mechanism could be used with a wide range of tractor draft link control systems by connecting the operating member 40 with that part of the control system which sets the desired draft-link position signal.

We claim:

1. A lever mechanism including an operating member, a support relative to which said operating member is displaceable, a lever pivotally mounted on the support about a pivot axis which is also translationally moveable, a pin on the lever, a rack on the operating member, and a bias means acting to translationally move the lever on its axis away from the rack to hold the pin and rack disengaged when the lever is released, the operating member being displaceable in a given direction relative to the support by translational movement of the lever on its moveable axis against the bias to bring the pin and rack into engagement followed by pivoting of the lever relative to the support with the pin and rack engaged.

2. A lever mechanism according to claim 1 in which the bias means comprises a spring which acts between the pivot axis and the support, the pivot axis being translationally moveable within a slot in the support which extends substantially at right angles to the intended direction of displacement of the operating member.

3. A tractor draft link control system including a lever mechanism according to claim 1, the operating member of the lever mechanism being connected with the remainder of the control system so that operation of the lever to displace the operating member in said given direction is arranged to initiate raising or lowering of tractor draft links.

4. A tractor with vertically pivotable draft links whose vertical position is controlled by a control system according to claim 3 and in which the lever mechanism is mounted on a rearward portion of the tractor to allow operation of the lever by an operator standing to the rear of the tractor at a location outside the draft links.

5. A tractor according to claim 4 in which when the lever is pivotted through a full pivotting sweep with the pin and rack engaged only a small raising or lowering of draft links results.

6. A tractor with vertically pivotable draft links and a draft link control system including an actuating means for vertically pivotting the draft links, a first control lever located adjacent an operators station of the tractor and operable via a linkage means to cause the actuating means to pivot the draft links, a second control lever located on a rearward portion of the tractor for operation by an operator standing to the rear of the tractor at a location outside the draft links, said second control lever being pivotally mounted on a support about a pivot axis which is also translationally moveable, a first formation on the second control lever, a second formation on an operating member connected with the linkage means, and a bias means acting to translationally move the second control lever on its axis away from the second formation to hold the first and second formation disengaged when the lever is released, the second control lever being operable to move the operating member, and hence the linkage means, to cause the actuating means to pivot the draft links by translationally moving the second control lever on its moveable axis against the bias to bring the first and second formations into engagement followed by pivotting of the second control lever relative to the support with the first and second formations engaged.

* * * * *